Aug. 15, 1967  P. W. SCHIPPER  3,335,747
FLOAT-ACTUATED LEVEL CONTROL MEANS WITH QUICK
CLOSING AND OPENING CHARACTERISTICS
IN A NON-MODULATED SYSTEM
Filed July 23, 1964  3 Sheets-Sheet 1

INVENTOR.
PIETER W. SCHIPPER
BY
Wheeler, Wheeler & Wheeler
ATTORNEYS

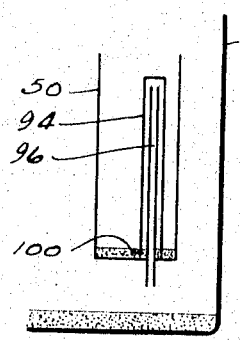
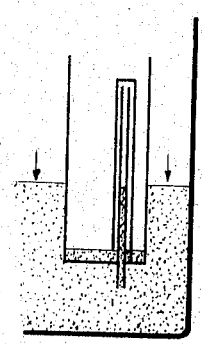
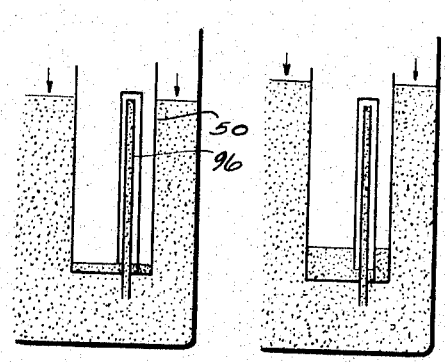
Fig. 2  Fig. 3  Fig. 4  Fig. 5
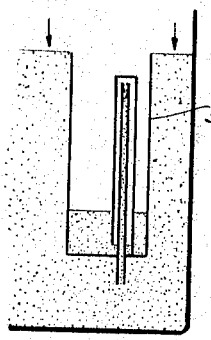
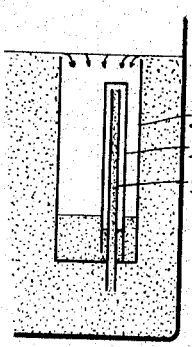
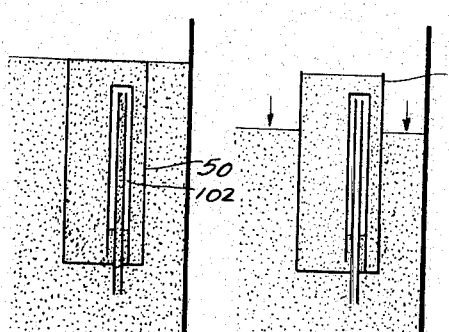
Fig. 6  Fig. 7  Fig. 8  Fig. 9
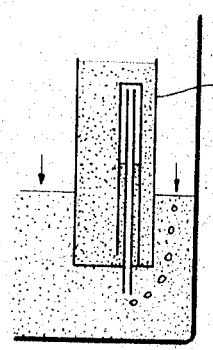
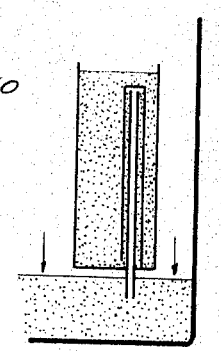
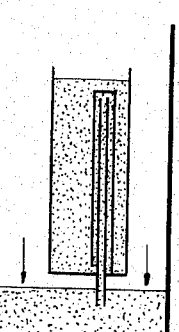
Fig. 10  Fig. 11  Fig. 12

Aug. 15, 1967  P. W. SCHIPPER  3,335,747
FLOAT-ACTUATED LEVEL CONTROL MEANS WITH QUICK
CLOSING AND OPENING CHARACTERISTICS
IN A NON-MODULATED SYSTEM
Filed July 23, 1964  3 Sheets-Sheet 3

INVENTOR.
PIETER W. SCHIPPER
BY
Wheeler, Wheeler & Wheeler
ATTORNEYS

United States Patent Office 3,335,747
Patented Aug. 15, 1967

3,335,747
FLOAT-ACTUATED LEVEL CONTROL MEANS WITH QUICK CLOSING AND OPENING CHARACTERISTICS IN A NON-MODULATED SYSTEM
Pieter W. Schipper, 975 Lone Tree Road, Elm Grove, Wis. 53122
Filed July 23, 1964, Ser. No. 384,605
18 Claims. (Cl. 137—414)

This invention relates to a float-actuated level control means with quick closing and opening characteristics in a non-modulated system. The invention also involves a unidirectional self-starting siphon which brings about a change in buoyancy of a float which is disposed in a float chamber separate from the tank in which level requires control.

The level control means may be used to control between accurately predetermined upper and lower limits the level of liquid in a tank. By referring to the fact that the valve operates without modulation, I am stressing the fact that in the preferred construction the filling and the emptying of the tank in which the level is controlled is desirably continuous at a constant rate between top and bottom limits. Under no circumstances is there a progressive decrease in the rate of filling the tank as the top level is approached. This differs sharply from ordinary float valve control in which the float controlled valve progressively approaches its seat to progressively reduce the rate of flow as the tank fills.

Various means for effecting the desired results are shown in the following disclosure, from which it will be apparent that although the filling operation is subject to the control of a float, a wide variety of electrical or mechanical means may be employed in the exercise of that control. The primary features of the invention consist in the provision of a float housing which is distinct from the tank which is to be filled through said valve, a float within that housing which is subject to buoyancy change in the sense that the level of liquid interiorly or exteriorly of the float is varied to cause the float to move, this change in liquid level being effected by means of a unidirectional siphon which is self-starting and may be made to function only when the controlled liquid reaches a lower level which may be very far below the level of the separate float chamber.

In one of the embodiments disclosed, the emptying of the float chamber, permitting the float to move downwardly, ultimately imposes the weight of the float on the valve mechanism in a valve opening direction. In a different embodiment, the siphon empties the float. In either case, a change in the buoyancy of the float ultimately operates the control mechanism. This may include a valve for opening and closing to determine flow into the tank of liquid from a pressure source, or it may comprise an electrically controlled pump which commences to operate when the tank is to be filled and discontinues operation when the upper level is reached.

In the case of a valve, there are innumerable ways to operate the valve mechanism. The valve can be mounted directly on the float to coact with a port located in the bottom of the float chamber. Or the float may communicate its motion to the valve through any appropriate lever system so that the valve may be actuated wherever it is disposed. As a third alternative, there is a servo-valve operated by a lever system and controlling a main valve which regulates flow into the tank rather than the float chamber. Finally, the invention contemplates the operation of a remote valve electrically through the closing of a circuit by means of a switch actuated by the float.

In all embodiments, the arrangement is such that no change in rate of flow necessarily occurs either during filling or emptying until the level substantially coincides with the point at which the filling or emptying is to cease. At that point, the float is subjected to change of position of a relatively very small amount of liquid and this small amount in the system disclosed, is adequate to effect control movement immediately.

In conventional float valve controls, a change in resistance of the valve mechanism or wear in the fulcrum or in the valve seat will change the level at which the valve closes or opens. In the instant device, the predetermined level never varies. Two fixed points determine upper and liquid lower levels as will hereinafter be explained. It is further desired to note that while reference has been made to a valve controlled by the float to admit liquid under pressure, it is also contemplated that the float may control a pump rather than a valve as a means of filling the tank, a pump and a valve being regarded as equivalent for the purposes of the control herein disclosed.

Figure 1:
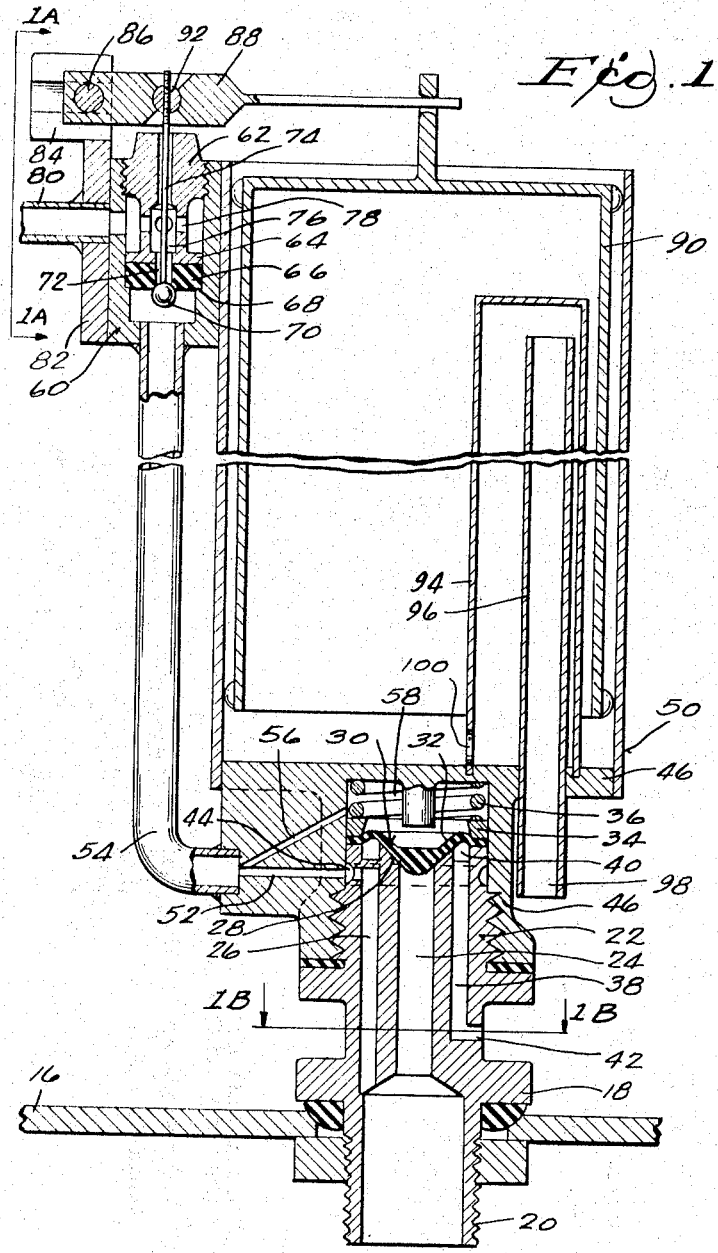
FIG. 1 is a view partially in axial section and partially in side elevation illustrating an embodiment of the invention.
Figure 1A:
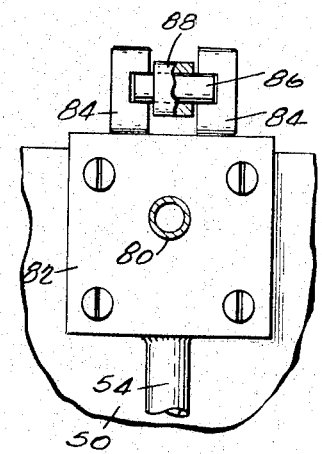
FIG. 1A is a detail view taken in section on the line 1A—1A of FIG. 1.

FIGS. 2 to 12 inclusive are a series of diagrams showing successive steps in the functioning of the siphon used in the structure of FIG. 1.

Figure 13:
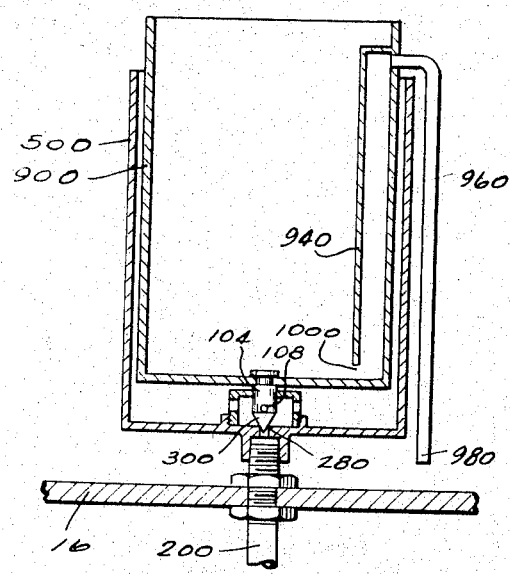

FIG. 13 is a fragmentary detail view showing a modified control structure in which the siphon operates to remove liquid from the float itself rather than from the float chamber externally of the float.

Figure 14:
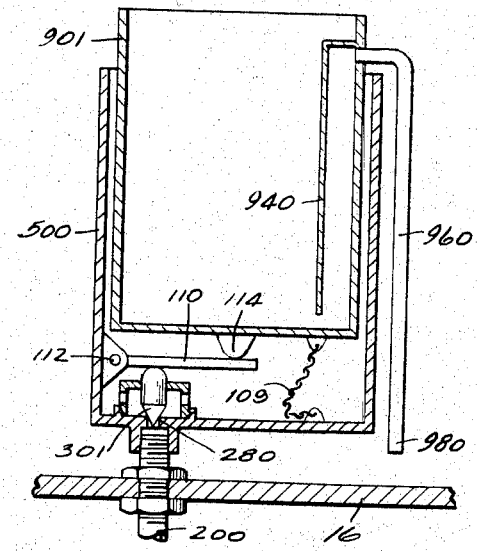

FIG. 14 is a view similar to FIG. 13 showing a slight modification.

Figure 15:
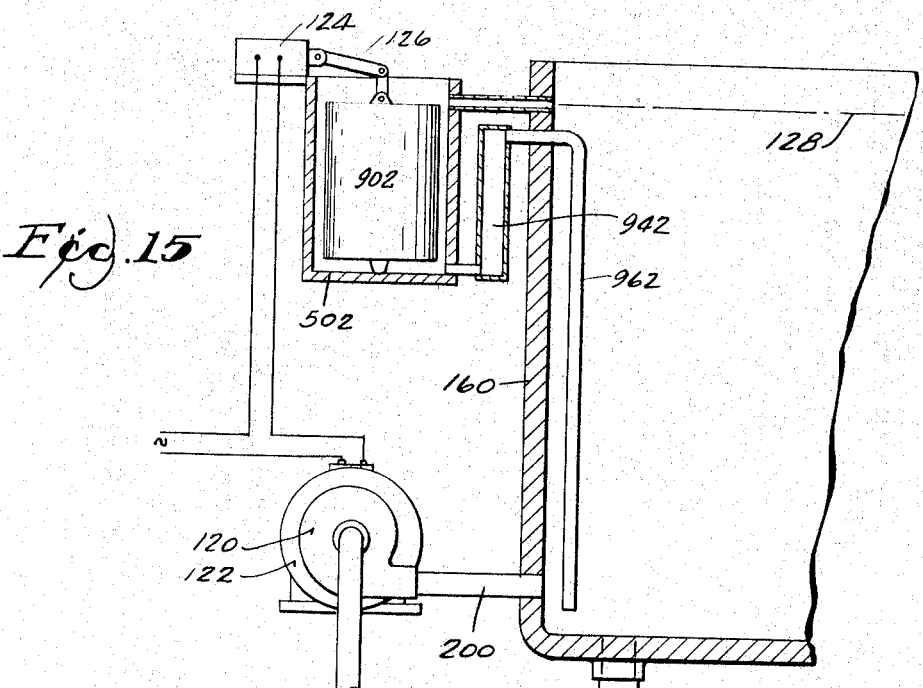

FIG. 15 is a diagrammatic view partially in section and partially in side elevation showing a further modified embodiment of the invention.

Figure 16:
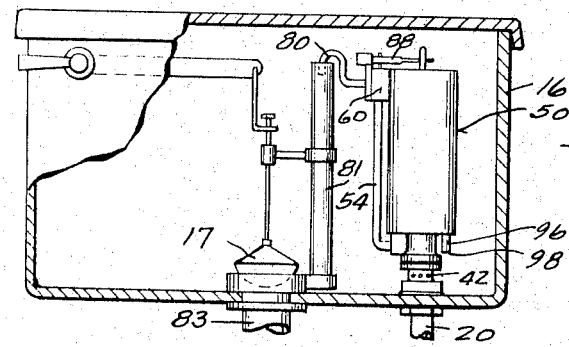
Figure 16:
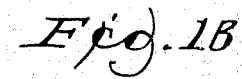

FIG. 16 is a view on a reduced scale partially in front elevation and partially in section and illustrating one possible installation of the device of FIG. 1 in a toilet flush tank.

In FIGS. 1 and 16, a tank 16 is a toilet flush tank having a conventional flush valve 17 with overflow stand pipe 81 bypassing the valve and leading directly to the flush pipe 83. The fitting 18 on the bottom of the tank is connected in any desired manner with a pipe 20 for supplying water under pressure. A column 22 on fitting 18 has a central passage 24 for the main water inlet and a bypass passage 26 for valve control purposes hereinafter described. At the upper end of the column 22 is a valve seat 28 engaged by a valve 30, the opening of which effects flow through pipe 20. The preferred valve constitutes the thickened central portion of a diaphragm 32, the marginal portion of which is clamped by a ring 34 and compression spring 36 to the upper peripheral portion of the column 22.

Figure 1B:
FIG. 1B is a detail view taken in section on the line 1B—1B of FIG. 1.
Figure 1B:
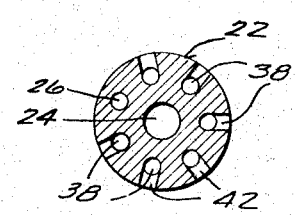

Surrounding the central opening 24 are a number of passages 38 opening from an annular channel 40 which surrounds the seat 28 (FIG. 1B). These passages have ports 42 discharging into the tank 16 so that when the valve 30 is lifted from seat 28 water will fill tank 16.

The control bypass passage 26 leads to an external peripheral channel 44. This passage is enclosed within the threaded base 46 of the float chamber 50. A radial duct 52 extends outwardly through the base 46 to a transfer tube 54. A branch duct 56 communicates with duct 52 and extends rearwardly to the chamber 58 overlying the valve 30.

The transfer tube 54 leads to a servo-valve or pilot valve casing 60 which may conveniently be supported on float chamber 50. A plug 62 threaded into the top of casing 60 engages a washer 64 which holds valve ring 66 to its seat on shoulder 68 of the casing. The pilot valve 70 controlling bypass relief port 72 through the ring 66 is mounted on a valve stem 74 reciprocably guided in the plug 62. A socket 76 at the lower end of the plug registers with port 72 to receive flow from the transfer tube 54 when the pilot valve is opened to relieve pressure on the main valve 30. The socket communicates laterally through duct 78 and pipe 80 to overflow. In the case of a toilet flush tank 16 the pipe 80 would discharge into the stand pipe 81 and flush pipe 83 to replenish water in the bowl following a flushing operation.

The mounting 82 which attaches pipe 80 to the valve casing 60 may also comprise an upwardly extending arm 84 supporting the fulcrum 86 for a float lever 88 which carries the downwardly open float 90. The float cross section is only slightly less than that of the chamber to minimize the amount of liquid which must move to vary float buoyancy to effect valve operation. A rotatable pintle 92 disposed transversely of lever 88 is transversely threaded for adjustably positioning the valve stem 74 threaded therein (FIG. 1). Thereby motion from lever 88 is transmitted to the valve as the lever is actuated by float 90.

A self-starting siphon varies the buoyancy of the float. This siphon is unidirectional in its operation. Most siphons remain filled with liquid at all times and immediately upon the occurrence of a change in relative level of the liquids with which the respective legs of the siphon communicate, the siphon will begin to function to restore equality of level.

In the instant device, the siphon only functions in one direction and, due to design, it traps air in the top of the siphon each time the tank is emptied. The relative capacities of the longer and shorter legs of the siphon are related to the length of the longer leg to be emptied. The arrangement is such that only when liquid in the controlled tank reaches the predetermined lower level does the liquid accumulating in the shorter leg expel the air bubble and overflow into the longer leg to initiate the action of the siphon.

When the siphon begins to function, it varies the buoyancy of the float. Intrinsically, the buoyancy of any object is, of course, a constant depending on its weight and volume and the liquid in which it is immersed. However, for the purposes of this application, a special meaning is assigned to the term "a change in buoyancy of the float." As will be explained hereafter, I may change the effective buoyancy of the float either by varying the depth of the liquid surrounding the float or by varying the depth (and hence the weight) of liquid contained within the float. In the instant embodiment, the desired change in effective buoyancy merely involves emptying the float chamber 50. As a matter of convenience and compactness of organization, the siphon is illustrated as being disposed within the downwardly open float. The siphon does not even have to be in the float chamber. The siphon includes two legs provided by a first siphon tube 94 and a second siphon tube 96. The latter is mounted in the base 46 to communicate at 98 through its lower end with tank 16 at a level below the lowest level at which liquid is required in the chamber. The first siphon tube 94 communicates through lateral port 100 with the interior of the float chamber 50. It opens well above the lower end of the second leg.

The length of the second siphon tube or leg 96 is directly related to the differential capacities of the respective legs. One of the advantages of the siphon herein disclosed consists in the fact that the lower controlled level may be very far indeed below the float itself and below the chamber 50 in which the float operates. All that is required is that the relative capacity of the short first leg 94 be sufficiently greater than the capacity of the second leg 96 so that the air bubble trapped in the siphon during the filling of the float chamber (and tending to be forced into and expelled downwardly from the second leg by changing differential pressures as the tank empties) will not leave the first leg completely until the tank level reaches the desired lower limit. Only at that time will the siphon start to function and it will only function in the one direction of operation. When the siphon does start to function, the buoyancy of the float is changed almost immediately and the control with which it is connected is immediately operated thereby.

Reference to FIGS. 2 to 12 inclusive will show how the siphon operates. In these views, the float is not shown.

FIG. 2 shows the situation in the float chamber 50 following a given operation. Residual liquid is left in the chamber 50 to the level of the top of orifice 100 in the first or outer siphon tube 94.

FIG. 3 shows the level of liquid rising in the tank externally of float chamber 50. Since the second siphon leg 96 communicates with the tank 16, the liquid will rise therein at the same rate and to the same level. FIG. 4 shows the situation when the liquid in the tank and in the second siphon leg has reached the top of tube 96. Thereupon liquid will commence to fill the float chamber 50 as shown in FIG. 5. Air is trapped in the first siphon leg at this time.

FIG. 6 shows the situation in which the liquid has reached the open top of the float chamber 50. It thereupon overflows into the float chamber 50 as shown in FIG. 7, creating a head of pressure within the float chamber which now forces some of the air trapped in the first siphon leg 94 to move downwardly in the second siphon leg 96, displacing liquid therefrom. When the float chamber 50 is completely full, as shown in FIG. 8, an air bubble 102 remains trapped in the siphon. This situation continues as long as water remains in the tank 16.

When water is withdrawn from the tank 16, as in the flushing of a toilet (if the tank is a flush tank) the water level externally of the float chamber 50 falls. As shown in FIGS. 9 and 10, the head of water in the float chamber 50 continues at a high value, being decreased only as water enters the siphon to displace the air due to the decreasing head on the second siphon leg. When the water level reaches the top of the second siphon leg as shown in FIG. 11, the siphon immediately starts to operate, its cross section being such that the water will fill it from side to side and all air being displaced as shown in FIG. 12. The result is to drain the float chamber immediately. Since the float is closely fitted to the chamber, there is very little water capacity in the float chamber, in normal practice. The siphon, in this device, is withdrawing water from the very limited annular space between the float and the chamber. Hence, the time required to drain the chamber from the situation of FIG. 12 to that of FIG. 2 is nominal.

It will be understood that dimensions of the parts will vary according to viscosity of the liquid and the particular requirements of the installation. However, by way of example, and not by way of limitation, dimensions will be given for a successful installation for handling water in the second siphon leg was .250″ and its external diameter of the float chamber 50 was 2.875″. The internal diameter of the tube 94 comprising the first siphon leg was .750″. The internal diameter of tube 96 comprising the second siphon leg was .250″ and its its external diameter was .375″. There was one inch clearance between the closed top of tube 94 and the top of chamber 50. The siphon tube 94 extended to a height of 6½″ above the bottom of float chamber 50. The siphon tube 96 extended to within ¼″ of the top of closed siphon tube 94 and 1″ below the bottom of float chamber 50. The port 100 opened to a level of ¼″ above the bottom of chamber 50. In the condition of the parts shown in FIG. 8, the bubble fills both tubes for a height of 5.46″.

In the condition of FIG. 9, the water level had fallen in float chamber 50 to .02″ below the top thereof. In the situation of FIG. 11, the water level had fallen .27″ in float chamber 50. At the initiation of siphon operation, as in FIG. 12, the water level had fallen .33″ in float chamber 50.

If the installation were such that it was necessary to establish the lower tank level six feet or more below the float chamber, all that would be required would be an increase in length of the long leg of the siphon and a corresponding increase in the volume capacity of the short leg of the siphon so that the amount of air trapped therein would be adequate to reach the desired lower level in the tank before the air bubble is completely displaced from the shorter leg.

As already indicated, it is possible to siphon the water from the float rather than from the float chamber. FIGS. 13 and 14 show arrangements to this end. These views further exemplify an independently usable feature involving the filling of the tank through the float chamber instead of the converse arrangement shown in FIG. 1. In this case, the float chamber is designated by reference character 500 and the float by reference character 900. The float is closed at its bottom and directly carries a valve stem 104 for moving the valve 300 to and from its seat 280, through which water enters from pipe 200. The water reaches the tank 16 by overflowing the top margin of float chamber 500.

The siphon is directly carried by the float. In this instance, it comprises a first leg 940 closed at its top and open at its bottom 1000 into the lower portion of the float 900. Near its upper end, the first siphon leg 940 communicates with a second siphon leg 960 which is a tube that hangs outside of the float chamber 500 and opens at 980 into the tank 16. While the structure looks quite different from that previously described, the operation is essentially similar. The draining of water from tank 16 permits the siphon to operate. In operation, it completely, or nearly completely, removes the liquid content of the float 900. The float thereupon rises in the liquid trapped in the chamber 500 and this opens valve 104 to admit liquid from the supply pipe 200. The arriving liquid overflows the chamber 500 to fill the tank 16. The buoyancy of the float 900 will not be permitted to occasion the lifting of the float beyond the range to which it is limited by the stop pin 108 on the valve stem 104. Accordingly, the water filling the tank 16 will ultimately exceed the level of the top of the float and fill the float to change its buoyancy, whereupon the weight of the float will re-seat the valve 300 to shut off the flow.

In the course of the filling operation, air will be trapped within the siphon and the siphon therefore will not function again until the water pressure on the two legs of the siphon is unbalanced by the draining of the tank as above described.

FIG. 14 is identical with FIG. 13 except that the float 901 can be made lighter than float 900 because it does not act directly on valve 301 but acts through a lever 110 pivoted at 112 to the side of the float chamber and engaged by a thrust member 114 on the under side of the float. In this instance, a tether of some sort such as the chain 109 limits the float to a range of movement such that the liquid of the tank will re-fill the float.

FIG. 15 exemplifies four separate departures from the devices previously disclosed, any one or more of which may be substituted in the previously discussed structures. The four changes are the control of level in a tank other than a flush tank; replenishing the water in the tank by starting and stopping a pump as distinguished from opening and closing a valve to control liquid under pressure; the location of the float chamber outside of the tank whose level is to be controlled; and the location of the siphon wholly outside of the float chamber.

The tank 160 has drain valve 170 and its inlet pipe 200 is supplied with water by a centrifugal pump 120 driven by motor 122 subject to the control of an electric switch 124 having an actuating lever 126 connected with float 902 in float chamber 502. When the siphon is mounted externally of the float chamber, it includes a first leg 942 opening at its lower end into the float chamber and with the upper end of which the second leg 962 communicates, the latter extending to a lower level in tank 160. The operation is substantially as above described. When the pump 120 fills tank 160 to the level indicated at 128, the liquid will flow over the top of chamber 502 to fill the chamber and to trap air in the siphon. The filling of the chamber lifts the float 902 to operate the switch actuating lever 126 to open the switch and stop the motor 122.

When the level of liquid in the tank falls to a point sufficient so that the reducing head of back pressure on the second leg 962 of the siphon permits the trapped air to move downwardly into that leg, water admitted to the first leg 942 from the float chamber 502 will ultimately flow into the top of leg 962, thus forcing out the air and initiating siphon operation to drain the float chamber 502 and start the pump.

In all of the embodiments of this invention, the point at which movement of liquid into the tank and the point at which such movement is terminated are fixed points determined by design and unaffected appreciably by wear or other factors. In all embodiments a change in buoyancy of a float is utilized to bring about the control; the float is in a chamber separate from the tank in which control is effected; and the change in buoyancy of the float is brought about by the operation of a unidirectional siphon.

I claim:

1. A non-modulated liquid level control system comprising the combination with a tank in which liquid levels are to be controlled between predetermined upper and lower levels, of a supply pipe leading to the tank, and means for effecting flow through said pipe and including a float chamber separate from the tank and open for liquid flow between the chamber and the tank at a predetermined liquid level, a float in the float chamber movable responsive to changes in buoyancy, motion transmitting means connected with the float, mechanism to receive motion from said transmitting means and for effecting flow through said supply pipe, and means including a unidirectional self-starting siphon for varying the buoyancy of the float in said chamber and thereby effecting flow through said pipe.

2. A system according to claim 1 in which said siphon comprises first and second legs, one of which communicates at its lower end with space within said chamber and the other of which communicates at its lower end with a portion of said tank below said chamber, said siphon being started into operation by lowering of liquid level in the tank to a predetermined level with respect to said chamber and, when operative, withdrawing liquid from the chamber.

3. A system according to claim 2 in which the said one siphon leg communicates with space between the float and the chamber, and said float is closely fitted within the chamber whereby to respond in buoyancy to changes in liquid level effected by displacement of an amount of liquid materially smaller than the capacity of the chamber.

4. A system according to claim 2 in which the float is open at its bottom and the first and second mentioned legs of the siphon are within the float.

5. A system according to claim 1 in which said float is hollow and substantially closed at its bottom and said liquid from the chamber siphon is operative to withdraw liquid from within said float whereby to increase the buoyancy thereof.

6. A system according to claim 5 in which the siphon comprises first and second legs, one of which communicates at its lower end with the interior of the float and the other of which communicates at its lower end with a portion of the tank below the float, the float being open at its top and the siphon having its first leg within the float and its second leg externally of said chamber.

7. A system according to claim 1 in which said siphon comprises a short first leg of relatively large cross section communicating at its lower end with space within the chamber, and a relatively long second leg of very materially less cross section than the first leg and communicating with said tank adjacent said lower level and materially lower than the lower end of the first leg, the said siphon being adapted to receive air into the first leg when the liquid in the tank is below the upper level and to trap such air within the siphon as the level of liquid in the tank is raised toward said upper level, the relative capacities of the first and second legs being so related that air trapped in the siphon will not be displaced wholly from the first leg by changing differential pressures to which the legs are subject during the lowering of levels in the tank until said predetermined lower level is reached, at which time flow from the first leg into the second leg of the siphon will initiate siphon action to vary the buoyancy of the float in said chamber.

8. A system according to claim 1 in which said pipe comprises a supply pipe for liquid under pressure, the means for effecting flow therethrough including a valve actuated in valve-opening direction by change of buoyancy of said float.

9. A system according to claim 8 in which the float is mechanically connected with said valve.

10. A system according to claim 8 in which the means for communicating motion includes a pilot valve and fluid pressure means controlled by the pilot valve for actuating the valve first mentioned according to the position of the pilot valve.

11. A system according to claim 8 in which the means for effecting flow through said pipe comprises a motor driven pump and the said mechanism comprises a switch and electrical connections from the switch to the motor driven pump.

12. A system according to claim 1 in which there is a switch having an actuator operatively connected by said motion transmitting connections to receive motion from the float, the means for effecting flow through the pipe including electrically responsive mechanism operatively connected electrically with said switch.

13. A non-modulated liquid level control system comprising the combination with a tank having predetermined upper and lower levels between which liquid levels are to be controlled, of a supply pipe leading toward the tank, and means for controlling flow through the pipe and including a float chamber separate from the tank disposed within the tank and open at its top for communication with the tank at a level approximating the said upper level of liquid in the tank, a float mounted for vertical movement in the float chamber responsive to changes in float buoyancy, means for effecting flow of liquid through the supply pipe toward the tank, means controlled by the float for rendering said flow effecting means operative upon a change of float position brought about by change in buoyancy of the float, and means for varying the buoyancy of the float and including a self-starting unidirectional siphon having one leg opening downwardly into the tank at a level materially below the lowest position of the float in said chamber and having another leg connected with the first leg and having its lower end communicating with liquid enclosed by said chamber at a level which is above the bottom of the chamber and from which the withdrawal of liquid will affect float buoyancy.

14. A system according to claim 13 in which said supply pipe opens into the float chamber and communicates through the float chamber with the tank to fill the tank when the float chamber overflows.

15. A system according to claim 13 in which the float has a cross section only slightly less than that of the chamber and is open at its bottom, the first and second mentioned legs of the siphon both having portions disposed within the float.

16. A system according to claim 15 in which said pipe comprises a source of liquid under pressure as a means for effecting flow therethrough and includes a valve, the float comprising means for the mechanical actuation of the valve.

17. A system according to claim 15 in which said pipe comprises a source of liquid under pressure as a means for effecting flow therethrough and includes a valve, means for applying pressure of liquid in said pipe for normally holding said valve to its seat and including a bypass liquid line leading from said pipe, a pilot valve having a port communicating with said bypass line and having beyond said port a connection to discharge, the mechanism connected to receive motion from said transmitting means including said pilot valve, the arrangement being such that the movement of said float in said chamber opens the pilot valve to bleed pressure from said bypass whereby pressure of liquid in said supply pipe opens the valve first mentioned for effecting flow of liquid toward said tank.

18. A non-modulated liquid level control system comprising the combination with a tank having predetermined upper and lower levels between which liquid in the tank is to be controlled, of a supply line leading to the tank, and means for effecting flow through the pipe and for terminating such flow when the said upper level is reached, said means including a float chamber separate from the tank and open for liquid flow between the chamber and the tank at said predetermined upper liquid level, a float in the float chamber movable responsive to changes in buoyancy, means for terminating flow through said supply pipe, means for transmitting motion from the float to the means for terminating flow and adapted to terminate flow when said upper predetermined level is reached, and means including a unidirectional self-starting siphon for varying the buoyancy of the float in said chamber, said siphon including a short leg of relatively large cross section communicating with liquid which is enclosed within said chamber, and a long leg of relatively small cross section extending externally of said chamber to the predetermined lower level of liquid in the tank, said short leg being adapted to trap air when the level in said tank is below said predetermined upper level and the relative capacities of the short and long legs being predetermined to constitute means whereby the trapped air is not completely displaced from the short leg until the water in the tank reaches the predetermined lower level.

References Cited
UNITED STATES PATENTS 3,158,173 11/1964 Bachli et al. _____ 137—414
3,195,565 7/1965 Mackie _____ 137—414

WILLIAM F. O'DEA, *Primary Examiner.*

I. WEIL, D. R. MATTHEWS, *Assistant Examiners.*

UNITED STATES PATENT OFFICE
CERTIFICATE OF CORRECTION

Patent No. 3,335,747　　　　　　　　　　　　　　　　August 15, 1967

Pieter W. Schipper

It is hereby certified that error appears in the above numbered patent requiring correction and that the said Letters Patent should read as corrected below.

Column 3, line 56, for "compactntss" read -- compactness --; column 4, line 62, strike out "the second siphon leg was .250″ and its external" and insert instead -- a toliet flush tank. In that installation, the internal --; column 8, line 33, for "line" read -- pipe --.

Signed and sealed this 22nd day of October 1968.

(SEAL)
Attest:

Edward M. Fletcher, Jr.

Attesting Officer

EDWARD J. BRENNER

Commissioner of Patents